United States Patent [19]

Reidel

[11] 4,340,330
[45] Jul. 20, 1982

[54] STRADDLING DOWEL

[75] Inventor: Josef Reidel, Bodman-Ludwigshafen, Fed. Rep. of Germany

[73] Assignee: Tox-Dubel-Werk Richard W. Heckhausen KG, Bundesrepublik, Netherlands

[21] Appl. No.: 109,765

[22] Filed: Jan. 7, 1980

[30] Foreign Application Priority Data

Jan. 12, 1979 [DE] Fed. Rep. of Germany ........ 2901066

[51] Int. Cl.³ .................... F16B 14/10; F16B 13/14
[52] U.S. Cl. ........................................ 411/33; 411/18; 411/34; 411/59; 411/62
[58] Field of Search ................ 411/16, 18, 32, 33, 411/34, 35, 36, 37, 38, 39, 57, 59, 60, 62, 75, 78, 79, 80

[56] References Cited

U.S. PATENT DOCUMENTS

| 665,705 | 1/1901 | Summerer | 411/33 |
|---|---|---|---|
| 1,316,640 | 9/1919 | Parsons | 411/78 |
| 1,320,622 | 11/1919 | Kennedy | 411/34 |
| 1,367,080 | 11/1927 | Ogden | 411/33 |
| 1,599,784 | 9/1926 | Osborne | 411/35 |
| 1,688,087 | 1/1929 | Mirzan | 411/360 |
| 2,147,357 | 2/1939 | Sholtes | 411/33 |
| 3,199,398 | 8/1965 | Weisz | 411/57 |
| 3,381,566 | 5/1968 | Passer | 411/36 |

FOREIGN PATENT DOCUMENTS

| 736625 | 6/1943 | Fed. Rep. of Germany | 411/16 |
|---|---|---|---|
| 2535237 | 2/1977 | Fed. Rep. of Germany | 411/38 |
| 1486161 | 5/1967 | France | 411/80 |
| 695632 | 9/1965 | Italy | 411/33 |
| 7400268 | 7/1975 | Netherlands | 411/37 |
| 1022013 | 3/1966 | United Kingdom | 411/16 |

*Primary Examiner*—Thomas J. Holko
*Attorney, Agent, or Firm*—Ostrolenk, Faber, Gerb & Soffen

[57] ABSTRACT

Disclosed is a straddling dowel, of plastic, having a continuous screw insertion hole and several expansion segments that are formed by longitudinal slits in the dowel body and which extend from the circular head portion to the circular foot portion of the dowel. In the latter part, a female thread can be cut by the inserted screw, thereby rendering axial expansion of the dowel body posible. The expansion segments are formed by overlapping annular plates or discs which, on spreading or axial expansion in the form of an increase in diameter or spreading move relative to each other over the whole extent of the contacting surfaces of adjacent plates or discs, which contacting surfaces run obliquely or conically to the axis of the dowel.

12 Claims, 3 Drawing Figures

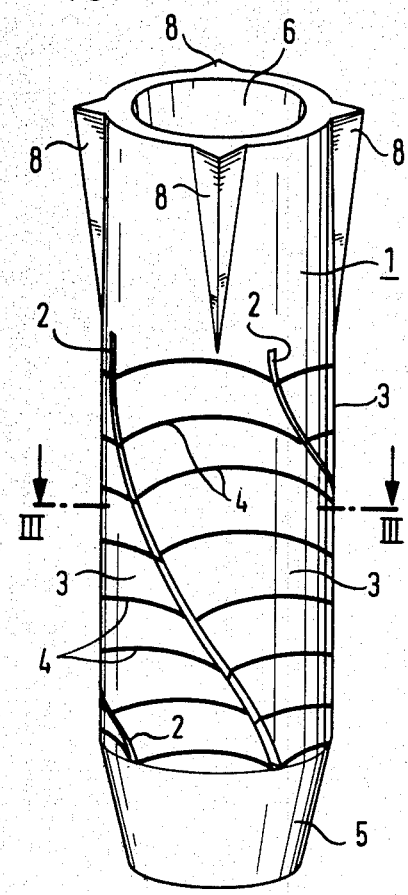
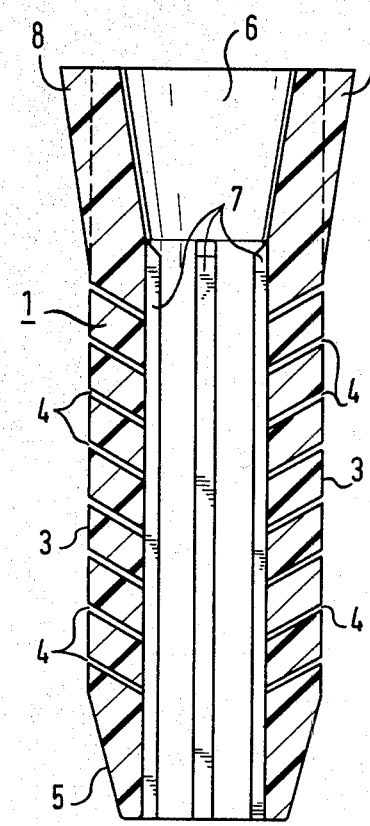
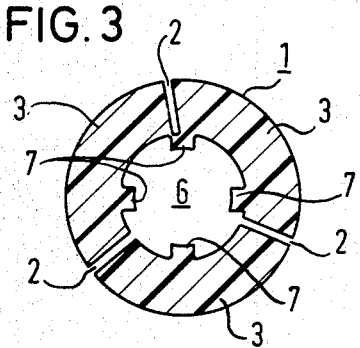

4,340,330

STRADDLING DOWEL

BACKGROUND OF THE INVENTION

The invention relates to a straddling dowel of the kind wherein the segments thereof press against the sides of the drill hole when the screw is inserted, in that the conically shaped wood screw that is inserted into the screw insertion hole forces the segments to the outside. Straddling dowels of this kind, have a closed foot (bottom) portion, in which the inserted screw can be imbedded by rotation of the screw. Such rotation also results in axial movement of the dowel and causes expansion, also have a buckling. As a result of the axial motion of the dowel the dowel segments that are separated by the longitudinal slits buckle radially to the outside if the dowel shell is unrestrained, i.e., is a hollow block or can spread out behind a panel. Dowels that have this double function have proved to be especially valuable in practice, since it has been possible to use particular types of screws suitable for particular cases. In general, the dowels were configured in such a way that in each case it is possible to use two different diameters of screws, according to whether easy insertion of the screw or great resistance to withdrawal was required in a particular case. However, resistance to withdrawal was reduced considerably if screws of smaller diameter were used.

The invention undertakes the task of improving dowels of the type described in such a manner as to ensure greater adaptability to various requirements and a greater variation of the screw fasteners.

The problem is solved by forming the expansion segments of the dowel from annular, overlapping plates or discs which, on spreading or axial movement of the dowel which results in an increase in diameter move relative to each other over the whole extent of the contact surfaces that run obliquely of conically to the axis of the dowel. By this means both during the dowel body spreading and in the axial movement of the dowel body, the individual plates or discs may move wedge-like on top of each other by sliding on top of each other along their contacting surfaces thus making individual contact between the plates and the sides of the drilling possible or, in the case of hollow blocks, permitting certain segments to penetrate individually into depressions in the sides of the drilling, thereby ensuring particularly good individual anchoring.

It is expedient that the longitudinal slits between the expansion segments be arranged in such a way that they run towards the inside of the dowel, helically to the foot portion of the dowel, and in such a manner that the separation plates so formed rest against the sides of the drilling opposite to the direction of withdrawal. This will ensure that, if a withdrawal force is applied, the plates, having their outer edges against the sides of the drilling, will be pressed more firmly against the sides of the drilling, each individual disc against the part of the sides of the drilling with which it is in contact.

Depending on the manner in which the length of the dowel is altered as a result of axial motion it is possible to bridge larger drillings or use screws of various diameters without reducing the holding power, because although the dowel becomes shorter as a result of the axial movement of the plates on top of each other, it becomes greater in diameter within fairly large limits. The use of a helical division of the dowel segments with a left-hand thread to the slits is a further advantage for the use of screws of various diameters.

An example of the invention will be described on the basis of the drawings, which show the following:

BRIEF DESCRIPTION OF THE DRAWINGS

FIG. 1 a perspective view of a straddling dowel according to the invention;

FIG. 2 an axial section of the dowel illustrated in FIG. 1 and;

FIG. 3 a cross-section on the line III—III in FIG. 1.

DESCRIPTION OF THE PREFERRED EMBODIMENT

The dowel, preferably manufactured by injection molding, has a closed annular head portion 1 and dowel segments, formed by helical slits 2. A dowel bottom 5 in the form of a closed ring is connected to these segments. The dowel segments are formed by an axial array of a plurality of discs 3 arranged one above the other and these, in turn, are formed and separated from each other by transverse, generally annular slits 4. The dowel has an axially extending screw insertion hole 6. This hole is conical in the head portion and cylindrical in the remaining portion down to the dowel bottom 5. There are longitudinal bars 7 in the screw insertion hole 6. These bars are axially disposed and are formed integrally with the dowel top 1, the dowel bottom 5 and the plates 3. As can be seen in FIG. 3, four such bars are arranged at equal angular distances from each other. The transverse slits 4 that separate adjacent plates and that also form the contact surfaces of the plates 3 lie in each case on a dowel shell. Each illustrated slit 4 tapers or inclines to the outside, and the slit extends downward as far as the dowel bottom 5. Each slit 4 has an upward inclination moving outwardly of the dowel body. By this means it is ensured that when the dowel spreads axially the plates slide one on top of the other and rest with their outer supporting edges against the sides of the drilling, opposite to the direction of withdrawal. This leads to a considerable increase in resistance to withdrawal. However, the invention also foresees the possibility of arranging the plates in the opposite direction, especially to accomodate special applications in which it is desired to remove the dowel from the drilling.

The three dowel segments in the center part of the dowel are formed by helical slits 2 that run counter-clockwise. This makes it possible to deform that portion of a dowel that is unrestrained in masonry to a rosette configuration. This is particularly advantageous for securing panels and when working with hollow (cavity-type) building materials.

At the top the exterior of the dowel is provided with ribs 8 that run longitudinally. These prevent the dowel from turning in a hole in which the dowels is installed. The invention also foresees the possibility of providing additional means to prevent the dowel turning, on the dowel shell and/or at the bottom 5 of the dowel.

The screw insertion hole 6 is of constant diameter in the center and bottom portions of the dowel. However, it is foreseen that the diameter of the screw insertion hole may be reduced at the bottom 5 of the dowel if it is desirable to cut in a deeper female thread.

When a screw is inserted into the screw insertion hole 6 of a dowel located in a drilling the screw thread will cut to a greater or lesser extent into the internal longitudinal bars 7, thereby spreading the plates 3 radially outwards, whereupon they will slide one on top of the other. As soon as the screw enters the bottom portion 5 and the screw head encounters resistance, the bottom portion 5 of the dowel will be drawn up toward the head of the screw and radial expansion of the plates 3 will take place, and because of the wedge effect, the plates 3 will run one on top of the other on their contact surfaces formed at the slits 4, thereby increasing the diameter of the outer dowel shell throughout the whole of the spreadable center section. Thus the individual plates or discs can each adapt to the appropriate place in the side of the drilling, i.e., individual discs can match wider portions of the drilling, and this will result in an especially favorable force distribution with greater resistance to withdrawal, even in the case of irregularly-shaped drillings.

The conical angle of the slits 4 can be selected on the basis of specific requirements. The more acute this angle, the greater will be the spreading force. The more obtuse the angle, the greater will be the spread diameter.

As has already been mentioned, the individual plates 3 or discs are connected to each other by the internal longitudinal bars 7 that hold the dowel together. As soon as the screw that is inserted has cut a thread into the dowel bottom 5, such connection is no longer necessary and for this reason on axial contraction of the dowel—or even before this occurs—the plates can break apart or break away from the longitudinal bars 7. This results in especially favorable individual spreading.

The ring sectors of the plates 3 that lie free on the outside of the unexpanded dowel are smooth. If necessary, these can be provided with transverse or longitudinal ribs. The plates 3 can also be connected to a continuous dowel shell that delimits the screw insertion hole, instead of to the longitudinal bars 7. However, the provision of bars is preferred in light of the possibility of using screws of various diameters. Nevertheless, the invention foresees the use of other ways to achieve the initial connection of the plates.

The dowel segment plates 3 are parallel sided in longitudinal section (FIG. 2), i.e., are formed in the shape of a parallelogram because of the equal inclination of all of the slits 4. However, for this invention it is foreseen that the slits 4 can be such that the cross-sectional shape of the segment plates is wedge-like, i.e., either trapezoidal or triangular, since this may be useful for specific applications because of the wedge effect.

The dowel may also be provided with a removable or slip-on type cap.

It is expedient that the dowel bottom 5 be tapered to facilitate insertion into the drilling.

I claim:

1. A straddling dowel, of plastic, including a body with a circular head portion and a circular foot portion, the body having a continuous longitudinal screw insertion hole, the body being comprised of several expansion segments arrayed around the body that are formed by longitudinal slits formed in the dowel body and each of which is integral from and extends from the circular head portion to the circular foot portion of the dowel, the insertion hole in the foot portion being shaped and sized so that a female thread can be cut in the portion by the inserted screw, thereby rendering axial contraction of the dowel body possible, each of the expansion segments being comprised of a longitudinal array of overlapping plates, each of the plates being separated from the next adjacent overlapping plates, and adjacent plates having engageable contact surfaces located longitudinally above and below the respective plates, each contact surface extending generally around the dowel body, the engageable contact surfaces each being directed to extend obliquely to the axis of the dowel and being near enough to the adjacent contact surfaces that radially applied force against the dowel body presses the adjacent contact surfaces into relatively movable engagement.

2. A straddling dowel according to claim 1, wherein the overlapping plates are separated from the next adjacent plates by lateral slits formed in the dowel segments, and the lateral slits run obliquely to the axis of the dowel, extend inward from the surface toward the interior of the dowel and are arrayed along the length of the dowel down to the foot portion of the dowel.

3. A straddling dowel according to either of claims 1 or 2, wherein the plates in the expansion segments are connected to each other by longitudinal bars located in and extending along the screw insertion hole.

4. A straddling dowel according to claim 3, wherein the axes of the bars are parallel and the bars protrude inwardly into the cross-section of the screw insertion hole.

5. A straddling dowel according to claim 4, wherein the longitudinal bars extend down into the insertion hole in the foot portion of the dowel.

6. A straddling dowel according to claim 3, wherein the outside of the dowel body is provided with means for preventing rotation of the dowel body in a hole in which the body is received.

7. A straddling dowel according to claim 1, wherein the longitudinal slits are helically shaped.

8. A straddling dowel according to claim 7, wherein the longitudinal slits are helically wound counter-clockwise while cooperating with right-hand thread screws installed in the foot portion of the dowel.

9. A straddling dowel according to either of claims 1 or 2, wherein the outside of the dowel body is provided with means for preventing rotation of the dowel body in a hole in which the body is received.

10. A straddling dowel according to claim 1, wherein the contact surfaces are inclined so as to be conically tapered.

11. A straddling dowel according to claim 10, wherein the contact surfaces are inclined to taper narrower toward the foot portion of the dowel.

12. A straddling dowel according to any of claims 1, 10 or 11, wherein the overlapping plates, viewed in longitudinal section, are wedge-shaped and tapering.

* * * * *

UNITED STATES PATENT AND TRADEMARK OFFICE
CERTIFICATE OF CORRECTION

PATENT NO. : 4,340,330

DATED : JULY 20, 1982

INVENTOR(S) : JOSEF REIDEL

It is certified that error appears in the above-identified patent and that said Letters Patent is hereby corrected as shown below:

ON THE TITLE PAGE,
 [73] CHANGE "BUNDESREPUBLIK, NETHERLANDS" TO --FEDERAL REPUBLIC OF GERMANY--

Signed and Sealed this

Ninth Day of May, 1989

Attest:

DONALD J. QUIGG

Attesting Officer

Commissioner of Patents and Trademarks